US009529780B2

(12) United States Patent
Priyadarshan et al.

(10) Patent No.: US 9,529,780 B2
(45) Date of Patent: Dec. 27, 2016

(54) DISPLAYING CONTENT ON A MOBILE DEVICE

(71) Applicant: Apple Inc., Cupertino, CA (US)

(72) Inventors: Eswar Priyadarshan, West Roxbury, MA (US); Irfan Mohammed, Woburn, MA (US); Joseph Cuccinelli, Needham, MA (US); Ravikiran Chittari, Acton, MA (US); Andrew Miller, South Natick, MA (US); Jayasurya Vadrevu, Lexington, MA (US); Jeremy W. Rothman-Shore, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 14/276,242

(22) Filed: May 13, 2014

(65) Prior Publication Data

US 2014/0337716 A1 Nov. 13, 2014

Related U.S. Application Data

(63) Continuation of application No. 12/138,876, filed on Jun. 13, 2008, now Pat. No. 8,762,556.

(60) Provisional application No. 60/943,778, filed on Jun. 13, 2007.

(51) Int. Cl.
| | |
|---|---|
| *G06F 15/16* | (2006.01) |
| *G06F 17/21* | (2006.01) |
| *G06F 17/22* | (2006.01) |
| *G06F 17/27* | (2006.01) |
| *G06F 3/00* | (2006.01) |
| *G06F 17/30* | (2006.01) |

(52) U.S. Cl.
CPC ......... *G06F 17/212* (2013.01); *G06F 17/2247* (2013.01); *G06F 17/272* (2013.01); *G06F 17/30905* (2013.01); *G06F 3/00* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 6,157,955 A * | 12/2000 | Narad | H04L 45/16 709/228 |
| 6,983,331 B1 | 1/2006 | Mitchell et al. | |
| 7,143,342 B1 * | 11/2006 | Baweja | G06F 17/30905 707/E17.121 |

(Continued)

FOREIGN PATENT DOCUMENTS

| | | |
|---|---|---|
| EP | 1569137 | 8/2005 |
| GB | 2366037 | 2/2002 |

OTHER PUBLICATIONS

International Search Report for PCT/US2008/066874, completion date Sep. 15, 2008 (4 pages).

(Continued)

*Primary Examiner* — Viet Vu
*Assistant Examiner* — James Edwards

(57) ABSTRACT

A method for facilitating the rendering of a web page on a mobile device includes providing an enhanced DOM tree for the web page that includes web page components and their display coordinates. A rule set is applied to the DOM tree, thereby selecting components for display on the mobile device. A mobile-device-specific version of the source code is generated based on the selected components.

24 Claims, 5 Drawing Sheets

(56) References Cited

U.S. PATENT DOCUMENTS

| | | | | |
|---|---|---|---|---|
| 7,269,664 B2* | 9/2007 | Hutsch | G06F 9/541 | 345/672 |
| 7,783,642 B1* | 8/2010 | Feng | G06F 17/30896 | 706/55 |
| 7,913,163 B1* | 3/2011 | Zunger | G06F 17/30864 | 715/234 |
| 8,065,667 B2* | 11/2011 | Kellogg | G06F 9/45529 | 715/205 |
| 8,181,107 B2* | 5/2012 | Melnyk | G06F 17/30905 | 715/238 |
| 2002/0010715 A1* | 1/2002 | Chinn | G06F 3/16 | 715/236 |
| 2002/0194388 A1* | 12/2002 | Boloker | G06F 8/38 | 719/310 |
| 2003/0012147 A1* | 1/2003 | Buckman | H04L 12/14 | 370/260 |
| 2003/0065745 A1* | 4/2003 | Wolfe | G06F 17/30905 | 709/219 |
| 2004/0049737 A1* | 3/2004 | Simon Hunt | G06F 17/30905 | 715/238 |
| 2004/0150637 A1* | 8/2004 | Chung | G06F 9/4443 | 345/418 |
| 2005/0022115 A1* | 1/2005 | Baumgartner | G06F 17/30911 | 715/205 |
| 2005/0027823 A1* | 2/2005 | Rana | G06F 17/30905 | 709/219 |
| 2005/0210035 A1* | 9/2005 | Kester | G06F 11/3476 | |
| 2006/0036955 A1* | 2/2006 | Baudisch | G06F 3/0481 | 715/747 |
| 2007/0027692 A1* | 2/2007 | Sharma | A61K 8/411 | 704/270.1 |
| 2007/0053382 A1* | 3/2007 | Bevan | H04L 41/0893 | 370/469 |
| 2007/0116223 A1* | 5/2007 | Burke | H04M 7/006 | 379/201.12 |
| 2007/0201761 A1* | 8/2007 | Lueck | G06F 17/30905 | 382/276 |
| 2008/0084572 A1* | 4/2008 | Capper | G06T 11/60 | 358/1.13 |
| 2008/0098300 A1* | 4/2008 | Corrales | G06F 17/30896 | 715/243 |
| 2008/0104502 A1* | 5/2008 | Olston | G06F 17/30902 | 715/229 |
| 2008/0120393 A1* | 5/2008 | Chen | G06F 17/30905 | 709/217 |
| 2008/0127341 A1* | 5/2008 | Chen | G06F 11/3608 | 726/22 |
| 2008/0139191 A1* | 6/2008 | Melnyk | G06F 17/30905 | 455/419 |
| 2008/0183573 A1* | 7/2008 | Muschetto | G06Q 30/02 | 705/14.41 |
| 2009/0125800 A1* | 5/2009 | Chen | G06F 17/30905 | 715/234 |

OTHER PUBLICATIONS

Written Opinion of the International Searching Authority for PCT/US2008/066874, completion date Sep. 15, 2008 (6 pages).

PCT International Preliminary Report on Patentability for corresponding International Application No. PCT/2008/066874, mailed Dec. 17, 2009, 7 pages.

* cited by examiner

```
▽ <div id = "page">
  ▷ <div id="toolbar">
  ▷ <div id=site_nav">
      <div class="clear_both">
  ▷ <div id="billboard">
```

FIG. 3A

```
rpage') _div. (@['id']=='banner')" q_eh="96" q_ew="950" q_ey="36" q_ex="-13" q-eid="37">
"q_dw="0" q_style=" background-color : #FFFFFF; color : #000000; display :
rpage') _div. (@['id']=='page") q_eh="132" q_ew="960" q_ey="132" q_ex="-13" q-eid="65">
statesman.com/custom/nospider/iml/images/bg_content.dig" q_eh = "3449" q_ew="960" q_ey="132" q_ex="-13" q_eid="6"/>
"0" "q_dw="0" q_style=" background-color : #CFDDE5; color : #000000; display :
outerpage') _div. (@['id']=='page') .div. (@['id']=='toolbar') q_eh="25" q_ew="950" q_ey="132" q_ex="0" q-eid="67">
lw="0" "q_dw=2" q_style=" color : #000000; display :
]=='outerpage') _div. (@['id']=='page') .div. (@['id']=='toolbar') .div. (@['id']=='tool_rss')" q_eh="15" q_ew="950" q_ey="139" q_e
q_dlw="0" "q_dw="0" q_style=" color : #000000; display :
]=='outerpage') .div. (@['id']=='page') .div. (@['id']=='toolbar') .div. (@['id']=='tool_search')" q_eh="15" q_ew="492" q_ey="139"
w="0" "q_dw="0" q_style=" color : #000000; display :
]=='outerpage') .div. (@['id']=='page') .div. (@['id']=='toolbar') .div. (@['id']=='tool_ur')" q_eh="15" q_ew="123" q_ey="139" q_ex
```

FIG. 3B

```
</div>
</div>
<div q_tlw="1236" q_tw="1520" q_dlw="0" q_dw="0" q_style=" background-color : #FFFFFF; color : #000000; display : block;" q_e4p="ghtmlDOM.body.div.(@['id']=='outerpage') .div. (@['id']=='page') q_eh="3449" q_ew="950" q_ey="132" q_ex="-13" id="page" q-eid="65">
<q-bgimg moz-userdefined="" src="http://www.statesman.com/custom/nospider/impl/images/bg_content.gif" q_h="3449" q_ew="950" q_ey="132" q_ex="-13" q-eid="66">
<q-bgimg><div q_tlw="6" q_tw="14" q_dlw="0" q_dw="0" q_style=" background-color : #CFDDE5; color : #000000; display : block;" q_e4p="ghtmlDOM.body.div.(@['id']=='outerpage') .div. (@['id']=='page') .div(@['id']=='toolbar') q_eh="25" q_ew="950" q_ey="132" q_ex="0" id="toolbar" q-eid="67">

<div q_tlw="2" q_tw="4" q_dlw="0" q_dw="2" q_style=" color : #000000; display : inline;" q_e4p="ghtmlDOM.body.div.(@['id']== 'outerpage') .div. (@['id']=='page').div(@['id']=='toolbar') .div. (@['id']=='tool_rss') q_eh="15" q_ew="177" q_ey="139" q_ex="0" id="tool_rss" q-eid="68">

More about: <a q_tlw="1" q_tw="1" q_dlw="1" q_dw="1" q_style=" background-color : #FF6600; color : #FFFFFF; font-weight : bold; display : inline;" q_e4p="ghtmlDOM.body.div.(@['id']=='outerpage') .div. (@['id']=='page') .div(@['id']=='toolbar') .div. (@['id']=='tool_rss') .a. (@['class']=='rssbitton') q_eh="15" q_ew="32" q_ey="140" q_ex="0" class="rssbutton" q-eid="69">
href="http://www.statesman.com/search/content/standing/rss.html">

<a q_tlw="1" q_tw="1" q_dlw="1" q_dw="1" q_style=" color : #006699; display : inline;" q_e4p="ghtmlDOM.body.div.(@['id']=='outerpage') .div. (@['id']=='page') .div(@['id']=='toolbar') .div. (@['id']=='tool_rss') .a[1]" q_eh="15" q_ew="38" q_ey="139" q_ex="107" href="http://www.statesman.com/content/news/stories/local/01/29/29mobile.html" q-eid="70">
Wireless</a>

<a q_tlw="1" q_tw="0" q_dlw="0" q_dw="0" q_style=" color : #006699; display : inline;" q_e4p="ghtmlDOM.body.div.(@['id']=='outerpage') .div. (@['id']=='page') .div(@['id']=='toolbar') .a[2]" q_eh="12" q_ew="18" q_ey="139" q_ex="148" href="http://www.statesman.com/content/news/stories/local/01/29/29mobile.html" q-eid="71">
<img q_tlw="0" q_tw="0" q_dlw="0" q_dw="0" q_style=" color : #006699; display : inline;" q_e4p="ghtmlDOM.body.div.(@['id']=='outerpage') .div. (@['id']=='page') .div(@['id']=='toolbar') .a[2]" q_eh="20" q_ew="18" q_ey="137" q_ex="48" q-eid="72" .a src="http://www.statesman.com/custom/nospider/impl/images/icon_pda.gif" alt="Wireless" id="wireless_icon" />
</a>
</div>

<div q_tlw="0" q_tw="6" q_dlw="0" q_dw="0" q_style=" color : #0000009; display : inline;" q_e4p="ghtmlDOM.body.div.(@['id']=='outerpage') .div. (@['id']=='toolbar') .div. (@['id']=='tool_search') q_eh="15" q_ew="492" q_ey="139" q_ex="177" id="tool_search" style="border: medium none ;" q-eid="73">
```

FIG. 3D

DISPLAYING CONTENT ON A MOBILE DEVICE

CROSS-REFERENCE TO RELATED APPLICATION

This application is a continuation co-pending U.S. patent application Ser. No. 12/138,876, filed on Jun. 13, 2008, which claims priority to and the benefit of U.S. Provisional Patent Application No. 60/943,778, filed on Jun. 13, 2007, which is hereby incorporated by reference in its entirety.

FIELD OF THE INVENTION

The present invention relates generally to the rendering of web pages, and, more specifically, to the processing of web pages for display on mobile devices.

BACKGROUND

A website on the World Wide Web can provide a variety of content to a user in various media formats. The challenge of providing such content to an end user increases as screen size is reduced (e.g., on a mobile device) because there is no reliable way to determine, from automated analysis of HTML, code, which parts of a web page must be retained and displayed to a user, and which parts of the web page need not be rendered.

One current approach utilizes the Document Object Model (DOM), a platform- and language neutral programming interface for HTML and XML, specified by the W3C, to generate a tree of nodes representing the structural components of the web page. Based on this DOM tree, the web page is split into smaller blocks, which are subsequently selected for display or discarded, depending on automatically assigned degrees of importance. One problem with this approach is its sole reliance on the analysis of the document structure, which may result in rankings of the various page portions that do not properly reflect content relevancy.

An additional challenge consists in the need to reflect updated web page content in the corresponding reduced-screen version of the page. Rather than re-analyzing the entire web page, it would be desirable to retrieve only updates of the components selected for display. However, localizing these portions is not trivial. One approach to this problem involves loading the document into a byte array and grabbing content at the desired array positions. This solution is impeded by updates preceding the desired content in the web page, which can shift the respective start and end points of the desired portion. Another method involves parsing the HTML source code for specific keywords, IDs, or other regular expressions in comments or tags. This approach is of limited applicability since not all web sites are able to clearly identify desired regions in this manner.

Accordingly, there is a need for systems and methods that can improve the processing of web pages for display on devices with reduced screen size.

SUMMARY OF THE INVENTION

The present invention addresses the need for adjusting web page content to mobile devices by intelligently analyzing both the source code and the display properties of a web page, and transferring selected portions of the results of such analysis to a mobile device for display. The analysis may involve parsing the source code of the page utilizing the XML Path Language, thereby generating an XPath DOM tree, and subsequently assigning x-y coordinates to each identified component of the tree, thereby visually enhancing the DOM tree. Based on the enhanced DOM tree, portions of interest may be selected for display according to a ULR-specific rule set.

The selection of web page components based on a combination of structural and display characteristics enables a statistically more reliable identification of portions that are important from a content perspective. It thereby improves the automatic creation of "mobile" web pages, i.e., web page versions adjusted for mobile devices. The term "mobile device" as used herein refers to web-access-enabling communication devices with reduced screen size and includes, but is not limited, to hand-held devices such as mobile phones.

In a first aspect, the invention provides a method for creating an enhanced DOM tree for a web page. The method involves parsing the source code of the web page to identify components; rendering the web page, e.g., in a web browsing application, to determine display coordinates of the identified components; annotating the source code by associating the display coordinates, the number of words within the current component and its subordinate components (sometimes referred to as "nodes"), as well as the width and height dimensions with the respective components; and storing the enhanced DOM tree on a physical storage device. The source code, or portions thereof, may be written, for instance, in HyperText Markup Language (HTML), Javascript or Extensible Markup Language (XML). Display coordinates can include horizontal and vertical distances of the components from an origin on the web page.

In another aspect, the invention provides a method for facilitating the rendering of a web page on a mobile device. The method involves providing an enhanced DOM tree for the page, which includes web page components and their display coordinates, and applying a rule set to the enhanced DOM tree, thereby selecting components for display on the mobile device. Rules may specify that certain elements in the XPath DOM tree, or certain elements at a particular location, are to be retained for later rendering while others may be discarded. For example, a rule may identify an image in the top left corner as a logo, and select it for display. The method further involves generating a mobile-device-specific version of the source code based on the selected components. In some embodiments, the method also includes the provision of this "mobile" version to a mobile device for display.

The rule set may cover broad aspects, such as excluding flash across a website, or it may be specific to the web page, to the domain at which the web page is hosted, or to a model of the mobile device. In some embodiments, a collection of rule sets with associated scope attributes is provided, and a suitable rule set is selected based on scope attributes of the web page. In certain embodiments, the application of the rule set involves categorizing the identified components, and, automatically or manually, selecting entire categories of components to be included when the web page is rendered on a mobile device. Such categories include, for example, text components, advertisements, navigational components, multimedia components, and images.

In a third aspect, the invention provides a system for facilitating the display of web pages on a mobile device. The system includes a web page browsing application configured to generate an enhanced DOM tree by selecting components based on the source code of the page and associating display coordinates with these components. The system further includes a component selection module configured to select components for display on the mobile device based on a rule set applied to the DOM tree, and to generate a mobile-device-specific version of the source code based on the selected components. The resulting mobile-device-specific source code can be stored on a physical storage device contained in the system. The system may also include a web server application which transmits the mobile-device-specific web page version to the mobile device upon request.

In yet another aspect, the invention provides an article of manufacture, on which computer-readable program portions for creating a mobile-device-specific version of a web page are embodied. The article contains instructions for generating an enhanced DOM tree for a web page; for applying a rule set to the DOM tree to select components for display on a mobile device, for generating a mobile-device-compliant version of the source code, and for providing this version to a mobile device for rendering.

BRIEF DESCRIPTION OF THE DRAWINGS

The foregoing discussion will be understood more readily from the following detailed description of the invention when taken in conjunction with the accompanying drawings.

FIG. 3A is a source code listing for an exemplary web page.

FIG. 3B is a diagram illustrating the DOM tree derived from the source code of FIG. 3A.

FIG. 3D illustrates the enhanced DOM tree of the web page of FIGS. 3A and 3C.

DETAILED DESCRIPTION OF THE INVENTION

Generally, the invention provides techniques and supporting systems that facilitate the display of a web page on a device of reduced screen size. In doing so, components of the web page that are deemed important or that meet certain criteria are identified in and extracted from the source code of the web page. In certain instances, the physical location of the components is critical to determining if a particular component will be included or not. In some cases, other attributes (name, size, type) may contribute to whether the component is included. For example, a news site may include a header image, multiple text stories, navigational components (menus, topics, etc.), advertisements, as well as other items. Because the page is designed to be rendered using a standard web browser operating on a personal computer (typically having a monitor of 17, 19 or 21 inches in size), usually, all of the components are rendered when the page is requested. However, as web-browsing functionality becomes ubiquitous on mobile devices e.g., PDAs, Blackberrys, smart phones, etc.), many consumers desire to "surf the web" using these devices. Because of the impracticality of including large screens on hand-held, mobile devices, the availability of screen real estate is compromised.

One approach often employed is to maintain two versions of the source code for the website. One, the standard or "fixed" version, includes all the components one would expect to see on the page. The second version, a "mobile" site, is developed separately and is pared down to only the core components—typically a header, a set of navigational links, and a few text items. Such an approach suffers from many drawbacks, including requiring additional staff to design and maintain two sites, as well as needing to coordinate content across both sites. In response, many content providers have looked to ways to automatically process their existing web site source code into "mobile-specific" source code. Furthermore, the variety of devices and the likelihood that content varies among web pages and web sites means that certain pages (or even individual requests for certain pages) may be processed differently. To address this challenge, the invention provides differing "rule sets" that facilitate the generation of page-specific, site-specific, and/or device-specific source code. By doing so, web pages (and in some cases entire web sites) that are designed for full-screen display can be rendered on mobile devices without requiring manual design and development of a second, "mirror" site.

Figure 1:
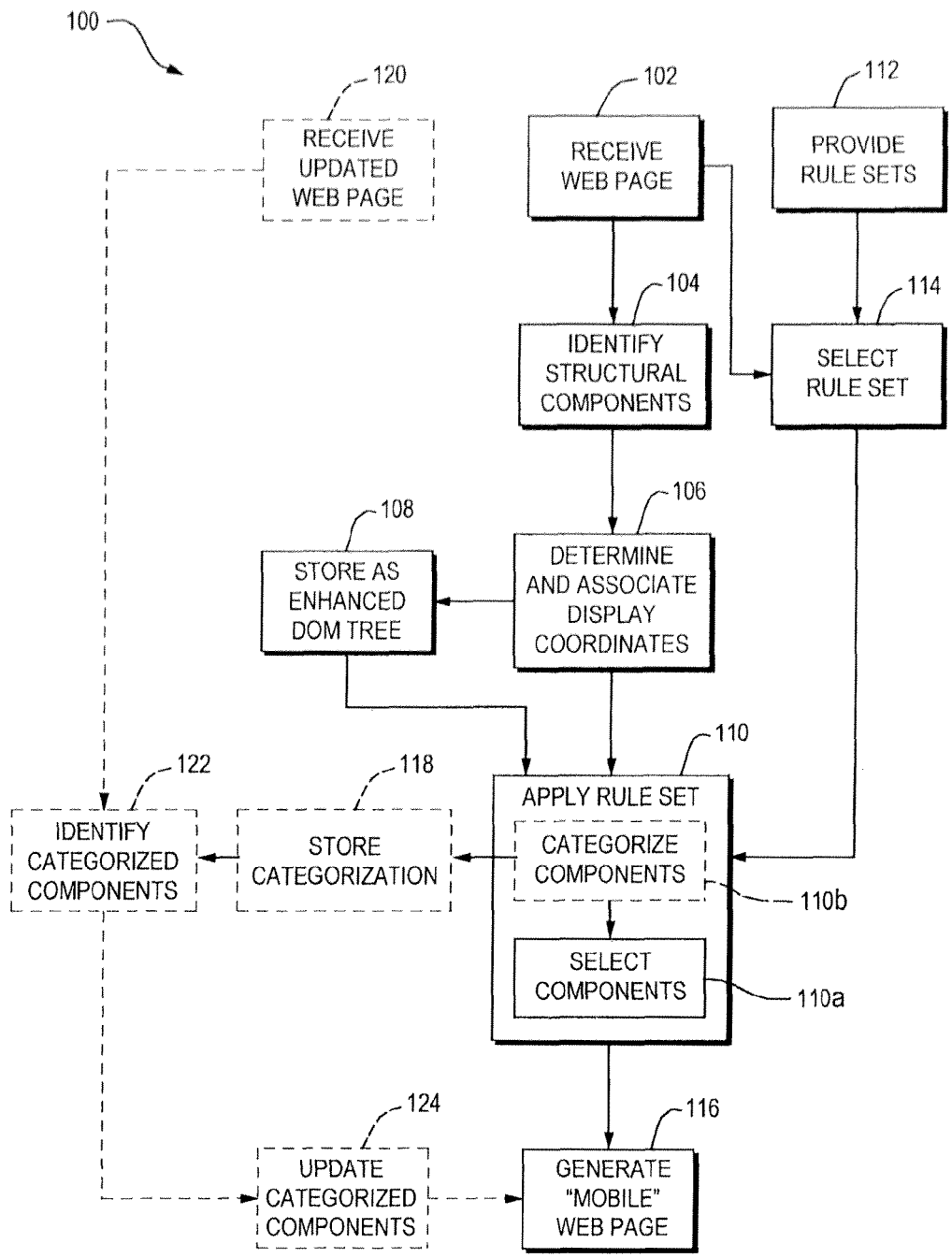
FIG. 1 is a flow chart illustrating a method for processing web pages for display on a mobile device according to one embodiment of the invention.

FIG. 1 illustrates a method 100 of creating a version (or versions) of web page source code for rendering on a mobile device according to one embodiment of the invention. In a first step 102, a web page is received for processing. For example, a user may manually provide the uniform resource locator (URL), or execute a link identifying the web page (or collection of web pages), or in some instances a list of pages may be maintained for periodical processing. Because many web sites are updated with great regularity (e.g., sites providing stock prices, sports scores or news headlines), processing may be done as frequently as every second.

Using the URL, a request for the source code (typically in HTML or some other markup language) of the web page is sent to the server on which the page is hosted. In response, the server provides the source code of the web page along with any data needed to render the page. Typically, the request and receipt of the web page is effectuated by a client-based application such as a web browser (e.g., Internet Explorer, Firefox, etc.).

In step 104, structural components of the web page are identified by parsing the HTML or XML source code of the page, as detailed further below. In step 106, the web page is rendered in an actual or a simulated web browser, and display coordinates are determined for and associated with each of the components identified in step 104. The display coordinates may, in some embodiments, be identified as (x,y) coordinates of the page, with the upper left corner of the page being identified as the origin, e.g., (0,0). The coordinates may be measured in one of many different units, including inches, centimeters, pixels, etc.

Adding the coordinates to the source code of the web page (step 106) results in a visually enhanced document object model ("DOM") tree of the web page. Typically, a DOM tree includes the string of markup commands (referred to as the "XPath") that defines how each component of the web page is to be rendered. However, by including the physical location of the components in the enhanced DOM tree, components that are rendered at particular locations can be identified. For example, a header image (a store's logo or newspaper's masthead) is typically located at the upper-left of a web page. By including location coordinates, an image located within a particular range of the origin and, in some cases, of a particular size, may be automatically identified as the site's logo, and therefore should be included in any mobile versions of the site. Likewise, navigational components (menu items) are typically listed along the left hand side of a page or across the top just below the logo, and will therefore share a common coordinate. For example, components listed down the left side will have the same x-coordinate. Once completed, the enhanced DOM tree can be stored in memory, a database, and/or in other non-volatile memory (step 108) for future use.

In some embodiments, the determination of display coordinates occurs simultaneously with the identification of structural components. For example, a user may view the web page in a browser and select a field of view (e.g., a selected area of the page) to be processed, and, in response, the browser may identify the structural components within or overlapping with the selected region. Similarly, functionality may be implemented which allows a user to visually select individual components of the web page as displayed to include as well as exclude sections of content, which subsequently creates corresponding XPath expressions in the DOM tree for the selected components.

In some implementations, the identification and/or selection of web page components to be included when displaying the web page on a mobile device includes the application of a rule set to the enhanced DOM tree of the page (step 110). In some cases, multiple rule sets are provided (step 112), and a rule set suitable for the particular web page is selected (step 114). Different rule-sets may be used, for example, for rendering the web page on different devices, for different domains, different pages or groups of pages within a domain, or some combination thereof. In one particular implementation, an application global data folder of rule set files may be provided, wherein each file is assigned a "scope" attribute defining the range of applicability of the rule set. For example, the scope may be a high-level domain (e.g., apply a particular rule set to all .edu sites), a domain and partial path, or the full URL. In some embodiments, the application global data folder is searched for the most specific scope that matches the received URL. In step 110, the rule set is applied to the web page in order to select the components of the enhanced DOM tree which are to be retained for display on a mobile device (step 110a). In certain embodiments, components may be classified into one or more content categories, such as, for example, logo, main text, navigation bar, image, or advertisement (110b), and the selection of components is made at the category level. In some implementations, a statistical probability that the assigned category reflects the actual content of the component can be quantified in a confidence rating. Certain categories may be automatically selected for display on the mobile device, and other categories may be automatically discarded. For example, a default set of rules may determine that a section of the website identified as logo should always be displayed on a mobile device, while a section identified as an advertisement should not be displayed, as different ads may be included that are specific to the device, the service carrier, etc. In some embodiments, categories may he manually selected by, for example, the publisher of the web site.

The XPaths of the selected page components are then written to a file, which may be used to generate a "mobile" version of the source code for the original web site (step 116). This step may include resizing, formatting, or otherwise adapting the components to a small screen. For example, images may he reduced by a particular percentage, while retaining their overall aspect ratio. In other cases, font sizes may he reduced to allow more text to appear on a mobile screen.

One objective of the present invention is to extract relevant sections of a web page as infrequently as possible (e.g., once a day), and to obtain updated content only as necessary for subsequent view requests. To enable such live "snapshots" of regular web sites without the need to repeat the entire page analysis, the selection and categorization of components undertaken in step 110b can be stored individually (step 118). If an updated web page is subsequently received (step 120), the components to be displayed can readily be identified and located (122), and updated with new content (step 124).

Each of the parsing, enhancement of the DOM tree, and selection of desired components to be included in the mobile-device-specific source code are described in greater detail below.

Figure 2:
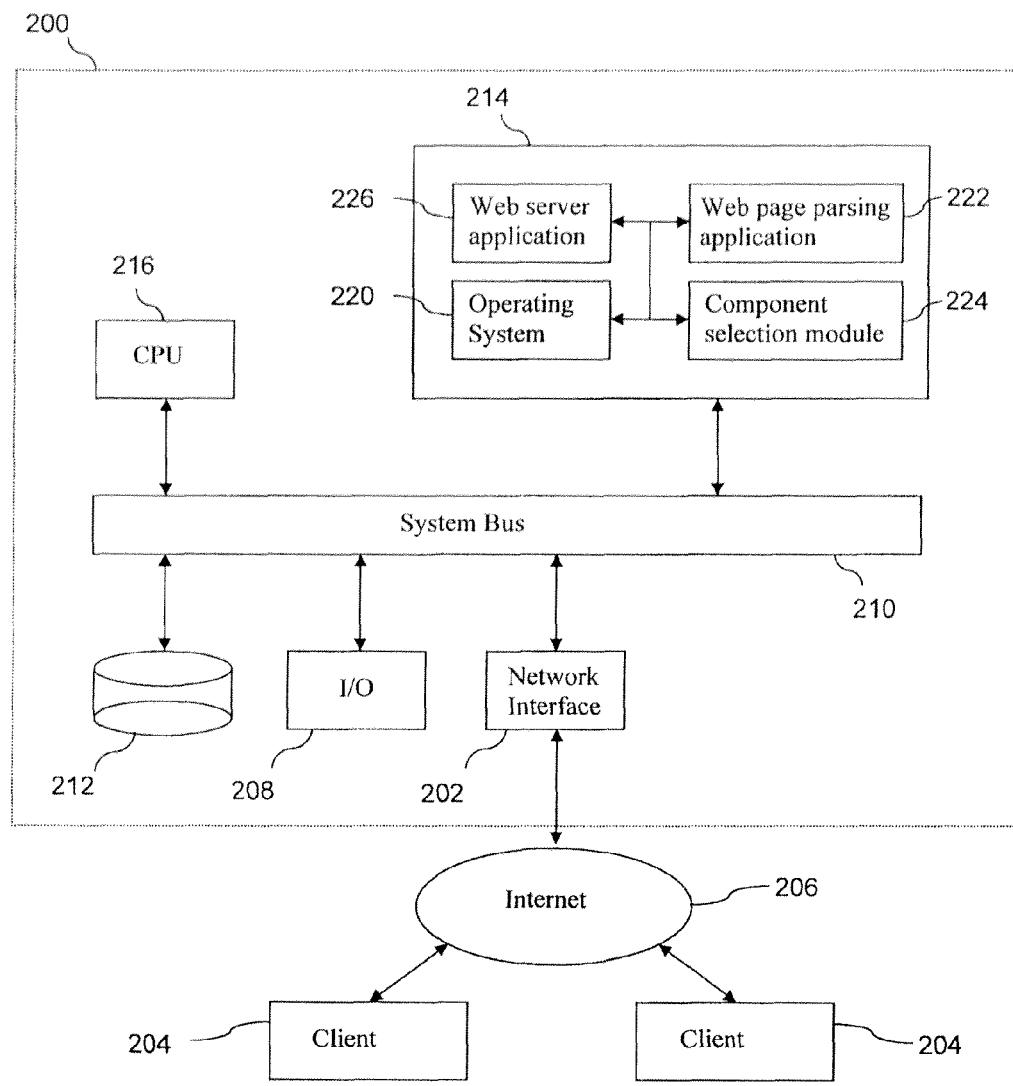
FIG. 2 is a block diagram of a system for processing web pages for display on a mobile device according to one embodiment of the invention.

The above-described method can be implemented on a single general-purpose computer, or, alternatively, on a system comprising several interconnected computers. FIG. 2 illustrates, in block diagram form, one embodiment of a computer server system 200 for facilitating the display of web pages on a mobile device. The system includes a network interface 202, which enables it to interact with clients 204 (e.g., other servers or mobile device users requesting mobilized versions of web pages) via a computer network 206, typically the Internet. A system administrator can interact with the system by means of input/output devices 208 (e.g., a keyboard and mouse, and a screen display). The system further includes a bidirectional system bus 210, over which the system components communicate, a physical storage device 212 (such as one or more hard disks and/or optical storage units), and a main (typically volatile) system memory 214. The operation of the system is directed by a central-processing unit ("CPU") 216.

The main memory 214 contains instructions, conceptually illustrated as a group of modules, that control the operation of the CPU 216 and its interaction with the other hardware components. An operating system 220 directs the execution of low-level, basic system functions such as memory allocation, file management, and operation of mass storage devices. At a higher level, various service applications implement method 100. A web page parsing application 222 generates an enhanced DOM tree for a web page. This application effectively simulates the behavior of a web browser, and is in various embodiments based on a web browsing application. The generation of web pages adjusted for mobile devices is carried out by a component selection module 224, which first applies a rule set to the enhanced DOM tree to select components for rendition on mobile devices, and then uses the selected components to generate a mobile-device-compliant version of the source code. The resulting mobile-device-compliant web page source code may be stored on the physical storage device 212 for subsequent transmission to a mobile device. To this end, the system further includes a web server application 226 which, upon request, provides the mobile-device-compliant source code to a client 204.

The web page parsing application and component selection module can be embodied on a computer-readable medium, such as, but not limited to, a floppy disk, a hard disk, an optical disk, a magnetic tape, a PROM, an EPROM, CD-ROM, or DVD-ROM, or downloaded from a server. The functionality of the method 100 may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

Source Code Parsing

The source code for web pages is based on a structured hierarchy of elements or components that are syntactically defined as expressions enclosed by well-defined start and corresponding end tags (i.e., standard terms in pointed brackets, such as "<table>"). These start/end tag pairs, along with the contents of the tags (e.g., the components that are rendered according to the tag properties are often referred to as "nodes" within the DOM. Parsers such as the Cobra Java HTML parser may be used to identify and extract the individual nodes to create a DOM tree representing the web page structure. Moreover, some web browsers include built-in XML, or HTML parsers. FIG. 3A provides an example of web page source code, and FIG. 3B illustrates a corresponding DOM tree derived therefrom.

While the source code syntax can, in principal, be used to infer the structure of a web page, problems often arise in parsing real-world web pages, which frequently contain non-compliant or non-conformant HTML or XML. For example, tags are sometimes not properly closed, or new tags (e.g., SPACER) are sporadically introduced. Both unclosed and unrecognized tags can result in unintended nesting of components within each other. Various embodiments of the present invention address this issue by restricting the nodes utilized for the generation of a DOM tree to a limited list of the most relevant tag pairs. For example, such a list may consist of the following tags, which have been found sufficient for defining the structure of most web pages: html, table, td, th, tr, tbody, thead, tfoot, div, span, form, font, center, p, ul, and li. Other tags found in the source code may be treated as regular, unparsed text.

Advanced web browsers often accommodate deficient HTML by inferring the intended web page layout and functionality, and correcting the DOM tree as necessary. For example, if the tag </table>, indicating the end of a table, is encountered in the middle of a table cell, the cell, row, and body are all closed implicitly; and if a table is placed underneath an open font tag, and the tag </font>, indicating the end of the section to which the font applies, is encountered within the table, it is ignored. Some embodiments of the present invention simulate this browser functionality through the specification of tag behavior in terms of various properties. For instance, the "CanCloseSelf" property indicates whether encountering a new instance of a tag inside an already existing instance of that tag implicitly closes the tag, and creates the new tag as its peer. Examples of tags that exhibit this behavior are "li" (for list items) and "p" (for paragraphs), whereas "table" and "div" (for divisions) are allowed to contain other instances of themselves. Tags listed in "AutoCloseExceptionTags" defy the "CanCloseSelf" property as well as a proper end-tag. In order to ignore an end-font tag (</font>) in a table, e.g., the "table" tag needs to be contained in the "AutoCloseExceptionTags" list. Other common exception tags include "html" and "body". A "RequiredParents" list may further specify the expected parent(s) of a certain tag, and when an instance of the (child) tag is encountered, any open tags in between the tag and its expected parent are automatically closed. For example, a "td" tag is generally expected to be a child of a "tr" tag. Therefore, if a "td" tag is encountered in an XPath node described by "/html/body[1]/table[1]/tbody[1]/tr[1]/td[1]/p[1]/font[1]", the "td", "p" and "font" tags are implicitly closed in order to parent the new "td" into its expected "tr" tag, i.e., the XPath will become "/html/body[1]/table[1]/body[1]/tr[1]/td[2]". An example node in the DOM based is shown below:

```
qhtmlDOM.body.div.(@['id']=='outerpage').div.(@
    ['id']=='page').div.(@['id']=='toolbar'). div.(@
    ['id']=='tool_rss')
```

Similarly, an "ImpliedHierarchy" list may compile tags whose existence is implied by a specific parent/child relationship, even if the tags are not explicitly included. The most common example is "tbody", which is implied by a "tr" that is a child of a "table". When a "tr" tag is encountered, a "tbody" is added to the table, and the "tr" is made a child of the "tbody". The properties described above can be determined for each tag of the list used to generate a DOM tree by creating test pages in a real browser, and then setting the properties accordingly. Based on this setting, the XPath is corrected as open tags and close tags are encountered, simulating the behavior of a real browser. Note that different browsers may handle tags slightly differently.

The structural modeling approach described above is generally highly effective to generate proper XPath DOM trees. However, certain situations, including the occurrence of dynamic HTML (such as client-side executed JavaScript), atypical structure choices, and the provision of different source code for different web browsers by a server may require special handling. In some embodiments, an interactive user interface is provided which may be used to visually identify components of interest, if applicable, within certain constraints, to ensure the selected content may be properly formatted for mobile devices.

Visual Enhancement

To associate display coordinates with the various DOM tree components, the requested web page is rendered in a commercially available web browser, or in a simulated web browser application, and the resulting page is scanned. During the scanning process, components are identified and the physical location of the component is captured. For example, a breaking news story will likely include a linked headline in a larger font, followed by a large body of text. The physical location of the headline and body text (in inches or pixels offset from an origin, for example), is determined, and in some cases, the components are linked to ensure the headline and text are either both selected or both not selected for mobile display. In one embodiment, the attributes of the rendered component (the text itself, link attributes, etc.) are compared to the XPaths for each "node" in the DOM tree, and if a match is found, the location information (i.e., the {x,y} coordinates of the component) are added to the XPath. As a result, an anchor tag (<a href="http:www.url.com">) that previously included only the location of the target webpage now includes the physical location of the link on the rendered page. One possible example of an enhanced anchor tag may be the following: <a x=2 y=3 href="http:www.url.com">, where "2" and "3" represent the x and y offsets, in inches, from an origin located at the upper left corner of the web page.

Figure 3C:
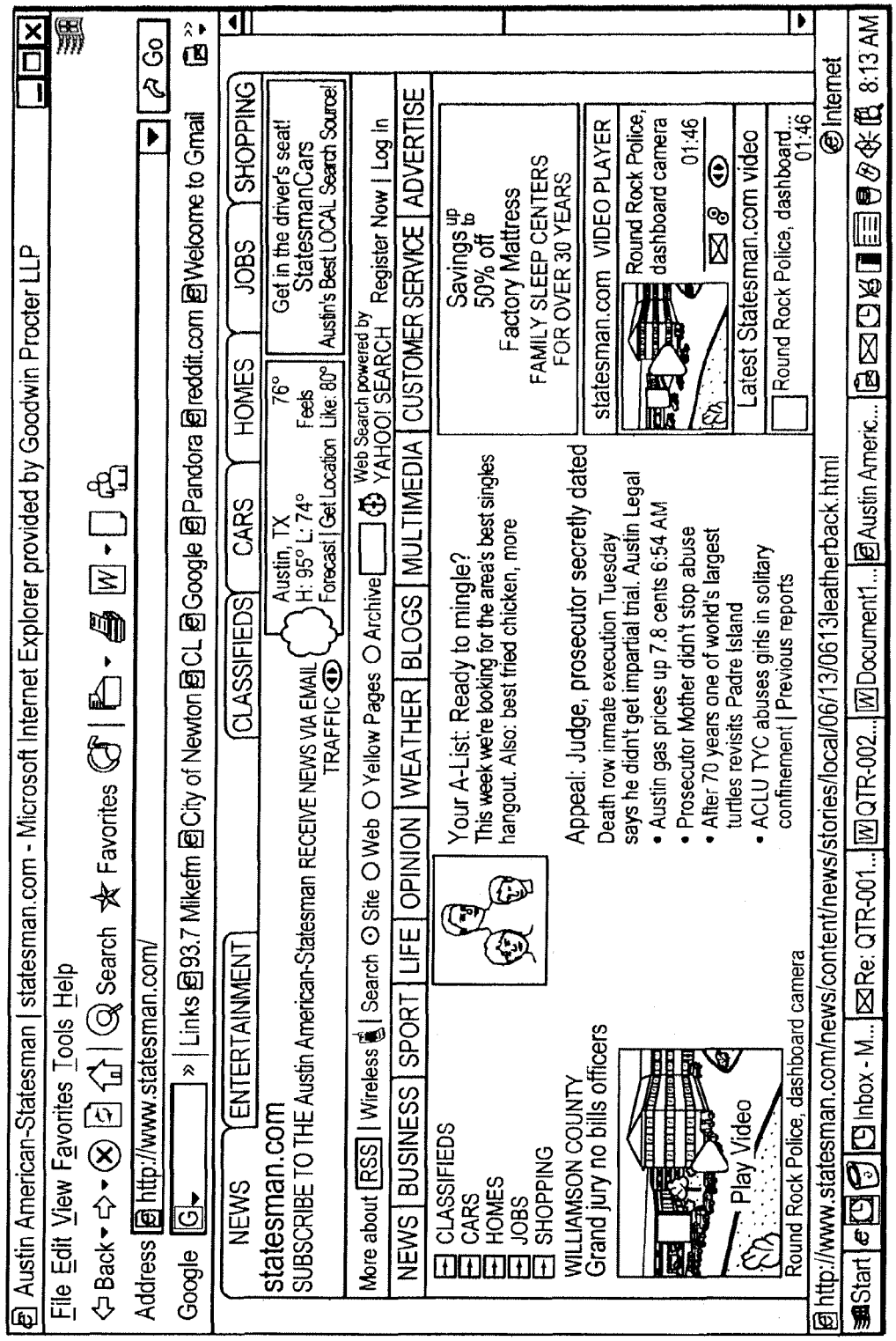
FIG. 3C is a screen shot of the web page of FIG. 3A.

Referring to FIGS. 3C and 3D, FIG. 3C is a screen shot of an exemplary web page rendered in Internet Explorer, and the screen-coordinate grab functionality is used to determine the x-y-coordinates of the components. For example, to grab content sections in a region bounded by x,y coordinates of (100, 200, 700, 600), a selector module uses the rule : qhtmlDOM..*.(@q_ex>=100 && @q_ex<=700 && @q_ey>=200 && @q_ey<=600). FIG. 3D illustrates an enhanced DOM tree that includes the visual location coordinates for each item on the web page of FIG. 3C.

Selecting Components for Display

As described above, one or more rule sets are used to identify and extract sections of interest of a web page based on the enhanced DOM tree of the page. These rules may specify, for example, that certain elements in the DOM tree, or certain elements at a particular location, are to be retained for rendering when requested by a mobile device, while others may be discarded.

In one embodiment, the rules of a set are organized into a JuicerRuleSet object, which may contain one or more rules regarding the identification and selection of components for inclusion in the mobile version of the web site. When a page is processed, these rules may be applied successively until one succeeds. If none succeeds, the JuicerRuleSet is considered to have failed.

The JuicerRuleSet to be applied can be specified directly in the Site.xml file associated with the website. Alternatively, if processing is initiated without a specific rule set, an application global data folder may be searched for an applicable set. Files in the global data folder have a "scope" attribute that defines what pages they are expected to apply to. The scope can be a partial domain (e.g., ".edu" or "example.com"), a full domain ("www.example.com"), a domain and partial path ("www.example.com/news") or even a full URL including parameters ("www.example.com/news/today.html?story_id=123"). From the global data folder, a file with the most specific scope matching the URL of the web page to be processed is selected.

A JuicerRuleSet may be encoded in an XML file or defined in Javascript, and may (but does not have to) include one or more of the following exemplary rules:

XPathJuicerRule: This rule defines how to extract content from the page based on the XPath of the page. It takes parameters including StartXPath, StopXPath, Inclusive, and Exclusive. StartXPath contains the XPath expression of the page node which should trigger the collection of data; and StopXPath contains the XPath expression of the page node which should trigger the interruption of data collection. Consequently, all data between the nodes specified in StartXPath and StopXPath is gathered. If the StopXPath is never encountered, data collection continues until the end of the page is reached. The StopXPath may default to the StartXPath. If the binary parameter Inclusive is true (default), content under the StopXPath node will be included; otherwise, content collection will stop as soon as the StopXPath is encountered. The multivariate parameter ExclusionXPath contains XPath expressions whose content should be ignored if they are encountered in between the StartXPath and StopXPath.

LargestSectionJuicerRule: This rule provides a straightforward way to find the largest text section on the page. It may take a parameter MinimumWords specifying the minimum number of words the returned section should contain, and a parameter (or parameters) AcceptableRootNode specifying the type(s) of section, as indicated by tags, that can be returned. If the initially determined largest section is smaller than specified by MinimumWords, or of a type other than those listed in AcceptableRootNode, successive parents of the section will be tested until a section is found that has at least the specified number of words and is of an acceptable type, or until the root of the document is reached.

RegularExpressionJuicerRule: This rule determines which content to extract from the page based on a regular expression (such as any text, special symbols, etc.) occurring on the page, which serves as a parameter for the rule. For example, the text in the first capture group containing the regular expression may be returned. By placing part of a regular expression inside round brackets or parentheses, that part of the regular expression may be grouped together and a regex operator (a repetition operator) may he applied to the entire group.

AlternateScopeJuicerRule: This rule allows the currently executed JuicerRuleSet to invoke another JuicerRuleSet. It can be advantageously employed in scope-specific rule sets, e.g., rule sets applicable to a certain domain (like "example-.com"). For example, the rule set can list a number of specific domain rules, and include an AlternateScopeJuicerRule as the last rule. If none of the domain-specific rules apply, the AlternateScopeJuicerRule can set the scope to a value provided in a Scope parameter, e.g., a domain fragment, a domain, or a domain and path. Alternatively, the scope can be set empty, and a non-specific, system-wide LargestSectionJuicerRule can be invoked.

Notification Rules: Notification rules can be added to a JuicerRuleSet to trigger specific behavior on a success or failure. Since these objects maintain state, they are kept in memory, or serialized in and out of memory when needed. An EmailNotificationRule may specify how to send an email about the success or failure of the processing steps. Parameters of the rule may include the email addresses of sender and addressee, subject lines indicating success or failure, respectively, the amount of time processing fails which triggers the email, the amount of time that elapses before another notification email is sent, and/or whether a success message is sent upon success following an email notification of failure. The determination whether processing has succeeded or failed can be based on a ContentValidationRule, which may specify, for instance, upper and lower limits for the number of images, links, or words identified during processing, which, if exceeded, result in an error state.

Pose Content Adaptation Rules: A JuicerRuleSet can be written to recognize, extract, and convert specific patterns of Web page content. For example, a Logo Rule can be written to recognize the logo on a web page by selecting candidate images with coordinates between (0, 0) and (200, 200), and then applying additional rules that match on typical logo file names (e.g., logo.png) or the link associated with the logo image (e.g., a link to the site's home page). Another example is a Site Navigation Rule which recognizes a list of links that comprise site navigation by extracting all link "strands" (vertically or horizontally organized HTML links), and further examining the link text and link targets to determine whether they point to standard destinations, such as "Home" and top-level site destinations. A third example is a Main Content Rule, which extracts only items that contain content items with a sufficient unlinked text count (i.e. text that is not the anchor text of a hypertext link), or items with a sufficient image size, to qualify as significant page content. A fourth example is an Article Rule, which searches within the page for a header tag (h1 through h5 HTML tags) that matches the page title, and then fetches all page content items that share the left margin coordinates of the selected header tag. Page Content Adaptation Rules can be used exclusively and automatically, or in conjunction with the other types of JuicerRuleSets described above, to provide optimal mobile adaptation of web pages.

Although the present invention has been described with reference to specific details, it is not intended that such details should be regarded as limitations upon the scope of the invention, except as and to the extent that they are included in the accompanying claims.

What is claimed is:

1. A computer implemented method comprising:
   receiving source code of an original web page in response to a request for the original web page;
   parsing the source code of the original web page to identify components of the original web page, yielding identified components;
   rendering the original web page in order to yield a rendered original web page;
   scanning the rendered original web page to determine display coordinates of the identified components;

annotating the source code of the original web page by associating the display coordinates with the respective identified components, thereby generating an enhanced document object model (DOM) tree for the original web page, wherein the display coordinates associated with the respective identified components include at least one dimensional value for the respective identified components, the at least one dimensional value defines a height or width for the respective identified components;

generating, by the computer, a mobile device specific enhanced DOM tree for the original web page by excluding, using a predefined rule set, at least one identified component of the original web page from the enhanced DOM tree for the original web page, wherein the at least one excluded web page component is not replaced; and storing the mobile device specific enhanced DOM tree on a physical storage medium.

2. The method of claim 1, wherein the source code of the original web page comprises XML.

3. The method of claim 1, wherein the display coordinates associated with the respective identified components also include one of a horizontal distance or a vertical distance of the respective identified components from an origin located on the original web page.

4. The method of claim 3, wherein the predefined rule set comprises a rule for selecting one or more identified components for inclusion or exclusion from the enhanced DOM tree based at least in part on the coordinates at which the one or more components are rendered in a web page by a web browser.

5. The method of claim 4, wherein the one or more components comprise a heading component and a body text component of the original web page and the rule set comprises a rule that the heading and body text components are both selected for inclusion in, or both selected for exclusion from, the enhanced DOM tree based at least in part upon a determination that the heading and body text are both rendered within a threshold offset value from the origin.

6. The method of claim 4, wherein the predefined rule set comprises a rule for selecting one or more identified components for inclusion in the enhanced DOM tree based at least in part upon a determination that the one or more components share a common coordinate.

7. The method of claim 4, wherein the predefined rule set comprises a rule that selects a component for inclusion in the enhanced DOM tree based at least in part upon a determination that the component comprises an image and that the coordinates of the rendered image are within a threshold value from the origin.

8. The method of claim 1, further comprising:
generating a mobile-device-specific version of the source code based at least in part on the mobile device specific enhanced DOM tree.

9. The method of claim 8, further comprising:
providing the mobile-device-specific version of the source code to a mobile device for rendering thereon.

10. The method of claim 8, wherein the rule set comprises one or more scope attributes that define whether the rule set is specific to at least one of: the web page, or the domain at which the original web page is hosted.

11. The method of claim 8, wherein the rule set is specific to a model of the mobile device.

12. The method of claim 8, wherein applying a rule set to the enhanced DOM tree further comprises categorizing the structural components.

13. The method of claim 12, wherein the categories comprise one or more of text components, advertisements, navigational components, multimedia components and images.

14. The method of claim 12, wherein the determination of the components to be included when rendering the web page on the mobile device further comprises at least one of: automatically selecting one or more categories of components to be included, or automatically selecting one or more categories to be excluded.

15. The method of claim 12, wherein a publisher of the original web page determines one or more rules for selecting the components to be included when rendering the web page on the mobile device.

16. The method of claim 8, wherein generating a mobile device specific version of the source code comprises at least one of: automatically generating source code to reduce a size of one or more images, or automatically generating source code to reduce a font size of one or more identified components that include text.

17. The method of claim 1, wherein the categories are selected by a predefined rule set that is manually generated.

18. The method of claim 1, further comprising:
providing the mobile device specific enhanced DOM tree and the original web page to a mobile device in response to a request for the original web page.

19. The method of claim 1, wherein rendering the original web page comprises rendering the original web page in a browser application to determine the display coordinates of identified components.

20. A system for facilitating the display of a mobile device specific version of an original web page on a mobile device, the system comprising:
a web page parser application configured to generate an enhanced document object model (DOM) tree for the original web page from the source code of the original web page, the enhanced DOM tree comprising: (i) web page components identified by parsing source code of the web original page, and (ii) display coordinates of said components, the web page parser application further configured to annotate the source code of the original web page by associating the display coordinates with the respective identified components in the enhanced DOM tree, wherein the display coordinates associated with the respective identified components include at least one dimensional value for the respective identified components, the at least one dimensional value defines a height or width for the respective identified components;
a component selection module configured to: (x) apply a predefined rule set to the enhanced DOM tree, the predefined rule set defining which components are to be selected for inclusion when rendering the web page on the mobile device, wherein the selecting excludes at least one identified component from the selected components, and (y) generate a mobile-device-specific version of the source code based on the selected components; and
a physical storage device for storing the mobile-device-specific version of the source code for subsequent transmission to a mobile device.

21. The system of claim 20, further comprising:
a web server application which, upon request of the original web page by the mobile device, transmits the mobile-device-specific version of the source code to the mobile device for display.

22. An article of manufacture having non-transitory computer-readable program portions embodied thereon for creating a mobile-device-specific version of an original web page, the article comprising non-transitory computer-readable instructions for:

generating an enhanced document object model (DOM) tree for the original web page, the enhanced (DOM) tree being generated from the source code of the original web page, the enhanced DOM tree comprising: (i) web page components identified by parsing source code of the original web page, and (ii) display coordinates of said components, annotating the source code of the original web page by associating the display coordinates with the respective identified components in the enhanced DOM tree, wherein the display coordinates associated with the respective identified components include at least one dimensional value for the respective identified components, the at least one dimensional value defines a height or width for the respective identified components;

applying a predefined rule set to the enhanced DOM tree, the predefined rule set defining which components are to be selected for inclusion when rendering the web page on the mobile device, wherein the selection excludes at least one identified component from the selected components; and generating a mobile-device-specific version of the source code based on the selected components.

23. The article of manufacture of claim 22, wherein the non-transitory computer-readable program portions embodied thereon further comprise instructions for providing the mobile-device specific version of the source code to a mobile device for rendering thereon.

24. The system of claim 20, wherein the predefined rule set is generated by a publisher of the original web page.

* * * * *